United States Patent
Nishikawa

(12) 
(10) Patent No.: US 6,650,490 B2
(45) Date of Patent: Nov. 18, 2003

(54) METHOD FOR MAGNETIC TRANSFER

(75) Inventor: Masakazu Nishikawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 312 days.

(21) Appl. No.: 09/793,956

(22) Filed: Feb. 28, 2001

(65) Prior Publication Data

US 2001/0024334 A1 Sep. 27, 2001

(30) Foreign Application Priority Data

Feb. 28, 2000 (JP) ..................... 2000-051177

(51) Int. Cl.⁷ .............................................. G11B 5/86
(52) U.S. Cl. ...................................... 360/17; 360/16
(58) Field of Search ........................ 360/16, 15, 17, 360/135, 131, 77.02, 78.04

(56) References Cited

U.S. PATENT DOCUMENTS

| | | | |
|---|---|---|---|
| 3,844,907 A | 10/1974 | Kitamoto et al. | |
| 4,363,038 A | 12/1982 | Fayling | |
| 5,693,397 A | * 12/1997 | Saito et al. | ................. 428/65.3 |
| 5,714,275 A | * 2/1998 | Yamazaki et al. | .......... 428/694 |
| 6,347,016 B1 | 2/2002 | Ishida et al. | |

FOREIGN PATENT DOCUMENTS

| | | |
|---|---|---|
| EP | 0 276 127 A2 | 7/1988 |
| JP | 49-44405 A | 11/1974 |
| JP | 58-26328 A | 2/1983 |
| JP | 63-177317 A | 7/1988 |
| JP | 63-183623 A | 7/1988 |
| JP | 10-40544 A | 2/1998 |
| JP | 10-269566 A | 10/1998 |

OTHER PUBLICATIONS

M. Nishikawa et al., Readback Properties of Novel Magnetic Contact Duplication Signal with High Recording Density FF, Magnetics Conference, 2000, Intermag 2000, Digest of Technical Papers, 2000 IEEE International, p. 542 (May 13, 2000).

R. Sugita et al., A Novel Magnetic Contact Duplication Technique for Servo Writing on Magnetic Disks, Magnetics Conference, 2000, Intermag 2000 Digest of Technical Papers, 2000 IEEE International, p. 541, (Apr. 13, 2000).

European Search Report dated May 31, 2002.

* cited by examiner

Primary Examiner—Alan T. Faber
(74) Attorney, Agent, or Firm—Sughrue Mion, PLLC

(57) ABSTRACT

A magnetic transfer method, wherein the master carrier for magnetic transfer having a magnetic layer with a magnetic recording information recorded thereon is closely fitted to the slave medium where the information is to be transferred, and a magnetic recording information of the master carrier for magnetic transfer is transferred to the slave medium, whereby magnetization of the slave medium is performed by initial DC magnetization in track direction, and then, the master carrier for magnetic transfer is closely fitted to the slave medium processed by initial DC magnetization, a magnetic field for transfer is applied in a direction opposite to the direction of the initial DC magnetization on the surface of the slave medium, and magnetic transfer is performed, whereby relation between anisotropy field (Hk) of a master carrier for magnetic transfer and coercive force (Hc) of a slave medium satisfies the following condition:

$$4 \times 10^{-4} < (Hk/Hc) < 2 \times 10^{-1}.$$

3 Claims, No Drawings

METHOD FOR MAGNETIC TRANSFER

BACKGROUND OF THE INVENTION

The present invention relates to a method for magnetic transfer to be used for transfer of a recording information to a magnetic recording medium in a magnetic recording/reproducing apparatus of large capacity and high recording density. In particular, the invention relates to a method for magnetic transfer to be used in the recording of servo signal, address signal, other ordinary video signal, audio signal, data signal, etc. to a magnetic recording medium of large capacity and high recording density.

With rapid development and progress in the utilization of digital image, amount of information to be handled in personal computers and other devices has extensively increased. Because of the increase of the amount of information, there are now strong demands on a magnetic recording medium, which has larger capacity to record the information and can be manufactured at low cost and requires shorter time for writing and reading operations.

In a high density recording medium such as hard disk or in a high density floppy disk type magnetic recording medium represented by ZIP (Iomega Inc.), information recording area has narrower track compared with the floppy disk now commonly used. In order that magnetic head can scan over narrow track width and signals can be recorded or reproduced with high S/N ratio, it is necessary to perform accurate scanning by the tracking servo technique.

In a large capacity magnetic recording medium such as a hard disk or a removable type magnetic recording medium, servo signal for tracking or address information signal, reproduction clock signal, etc. are recorded with a certain spacing between them within one turn of the disk. By reproducing these signals with a given spacing, the magnetic head accurately scans over a track while checking and correcting the position of the head. It is generally practiced that these signals are recorded on the magnetic recording medium in advance in a process called "preformat" at the time when the magnetic recording medium is manufactured.

Accurate positioning is required for the recording of signals such as servo signal for tracking, address information signal, reproduction clock signal, etc. In this respect, after the magnetic recording medium is incorporated in a drive, preformat recording is performed by a magnetic head under strict position control using a special-purpose servo recording system.

However, in the preformat recording of signal such as servo signal, address information signal, or reproduction clock signal by the magnetic head, much time is required for the preformat recording in order to perform the recording with the magnetic head under strict position control using a special-purpose servo recording system. Also, with the increasing requirements on higher magnetic recording density, the amount of signals to be recorded by the preformat recording is increased, and this means that still more time is required. Therefore, in the manufacture of a magnetic recording medium, the percentage of the cost required for the preformat recording process such as servo signals in the total manufacturing cost is increased, and there are strong demands to reduce the cost for this process.

On the other hand, a method has been proposed to perform magnetic transfer of the preformat information from a master carrier to a slave medium without recording the preformat information for each track. For instance, such transfer technique is disclosed in JP-63183623(A), JP-10040544(A), and JP-10269566(A).

According to the method described in JP-10040544(A) or JP-10269566(A), surface irregularities (convex and concave portions) corresponding to the information are formed on the surface of a substrate used as the master carrier for magnetic transfer. The surface of the master carrier for magnetic transfer where ferromagnetic thin film is formed at least on the surface of convex portions is brought into contact with the surface of sheet-like or disk-like magnetic recording medium where ferromagnetic thin film or ferromagnetic power coating layer is formed. Or, by exciting a ferromagnetic material on the surface of convex portions through application of AC bias magnetic field or DC magnetic field, magnetized pattern to match the surface irregularities is recorded on the magnetic recording medium.

According to this method, a predetermined preformat information is formed on the slave medium by closely fitting the surface of convex portions of the master carrier for magnetic transfer to the magnetic recording medium for preformatting, to the slave medium, and by exciting the ferromagnetic material of the convex portion. Thus, the recording can be carried out statically without changing relative positions of the master carrier and the slave medium, and accurate preformat recording can be achieved. Moreover, the time required for the recording can be reduced.

This magnetic transfer method is a method to transfer by bringing both the master carrier and the slave medium in contact with each other in static state. As a result, damage seldom occurs to the master carrier for magnetic transfer or to the slave medium in the process of servo signal recording, and high durability can be ensured.

As the magnetic substance to be used for the master carrier for magnetic transfer, soft magnetic material is generally used. Based on the concept that it would be better in the magnetic substance to have a magnetic layer with lower anisotropy field (Hk) and to be saturated with lower magnetic field in order to have higher transfer efficiency, a material with anisotropy field of lower than $Hk<8.0\times10^{-2}$ kA/m (1 Oe) has been considered as a possible candidate substance. However, when magnetic transfer is performed on a magnetic layer with anisotropy field of lower than $Hk<8.0\times10^{-2}$ kA/M (1 Oe), signal output and half-width of magnetic transfer are changed and signal quality varies. Also, when anisotropy field (Hk) of the master carrier is increased, the signal of magnetic transfer is turned to less sharp, and output is decreased.

It is an object of the present invention to provide a method for preventing deterioration of the quality of the signal transferred when a recording information recorded on a master carrier for magnetic transfer is transferred to a slave medium.

SUMMARY OF THE INVENTION

The present invention provides a magnetic transfer method for performing magnetic transfer to a magnetic recording medium, whereby relation between anisotropy field (Hk) of a master carrier for magnetic transfer and coercive force (Hc) of a slave medium satisfies the following condition:

$$4\times10^{-4}<(Hk/Hc)<2\times10^{-1}.$$

Further, the present invention provides the magnetic transfer method as described above, wherein the master carrier for magnetic transfer having a magnetic layer with a magnetic recording information recorded thereon is closely fitted to the slave medium where the information is to be transferred, and a magnetic recording information of the master carrier for magnetic transfer is transferred to the slave medium, whereby magnetization of the slave medium is performed by initial DC magnetization in track direction, and then, the master carrier for magnetic transfer is closely fitted to the slave medium processed by initial DC magnetization, a magnetic field for transfer is applied in a direction opposite to the direction of the initial DC magnetization on the surface of the slave medium, and magnetic transfer is performed.

DESCRIPTION OF THE PREFERRED EMBODIMENT

According to the present invention, when a recording information is transferred to a magnetic recording medium by magnetic transfer, it is possible to prevent deterioration of the quality of the signal transferred by magnetic transfer if magnitude of anisotropy field (Hk) of the master carrier is at a constant level with respect to coercive force (Hc) of the slave medium.

In the magnetic transfer of the recording information, soft magnetic material is generally used as the master carrier for magnetic transfer. In particular, it has been considered that a magnetic layer with lower magnetic anisotropy (Hk) and to be saturated with lower magnetic field would be more suitable in order to have higher transfer efficiency.

In this connection, a material with magnetic anisotropy (Hk) lower than $8.0 \times 10^{-2}$ kA/m (1 Oe) is used. In this case, if the master carrier for magnetic transfer is closely fitted to the slave medium, the magnetization of the magnetic layer on the master carrier for magnetic transfer is saturated even in case of a weak magnetic field. For this reason, the magnetization of the magnetic layer of the master carrier for magnetic transfer may be saturated in a magnetic field of geomagnetism, which is about 30 A/m, or in residual magnetization of iron core of electromagnet. As a result, magnetizing condition varies on the slave medium other than the portion where the recording information is recorded, and this leads to the deterioration of signal quality.

On the other hand, when a master carrier for magnetic transfer is used, which is provided with a magnetic layer with high magnetic anisotropy, much time is required until saturation magnetization is reached. When magnetic field is applied with the master carrier closely fitted to the slave medium, the magnetic field to be absorbed to the magnetic layer on the magnetic carrier for magnetic transfer leaks out to the slave medium. This results in the change of magnetization of the slave medium with the pattern of the recorded information, and the output is decreased.

Bases on the results of analysis as described above, the relation between the magnitude of the anisotropy field (Hk) of the master carrier and coercive force (Hc) of the slave medium was assessed in detail. As a result, it was found that deterioration of the quality of the signal recorded by the magnetic transfer method can be prevented if the following condition is satisfied:

$$4 \times 10^{-4} < Hk/Hc < 2 \times 10^{-1}$$

The present invention provides a magnetic transfer method for performing magnetic transfer to a magnetic recording medium with a master carrier for magnetic transfer closely fitted to a slave medium, whereby the relation between anisotropy field (Hk) of the master carrier and coercive force (Hc) of the slave medium satisfies the condition of $4 \times 10^{-4} < Hk/Hc < 2 \times 10^{-1}$.

The master carrier for magnetic transfer to be used in the magnetic transfer method of the present invention can be produced by the following procedure:

As the substrate for the master carrier for magnetic transfer, a material with smooth surface such as silicon, aluminum, glass, synthetic resin, etc. may be used.

First, photo resist is coated on the substrate, and a resist pattern to match the pattern formed by the magnetic transfer is formed by pattern exposure or direct marking.

In case of the pattern exposure, the pattern is formed on the substrate by reactive etching, or by physical etching using argon plasma, or by etching using liquid.

Next, a magnetic layer is provided in a predetermined film thickness by sputtering. Then, the photo resist is removed by lifting-off. Or, only convex magnetic layer in contact with the slave medium in the magnetic transfer may be produced by lithography technique.

As a procedure to achieve fine fabrication, injection molding method may be adopted. Description will be given now on the injection molding method. Laser beam modulated to match the servo signal is irradiated while a glass substrate coated with photo resist is being rotated, and the photo resist is exposed to light over the entire surface of the glass. The resist is then developed, and the glass substrate is developed, and surface irregularities (convex and concave portions) are formed on the glass. Next, the resist is removed, and plating is performed on the glass substrate with surface irregularities, and an original plating member with convex and concave portions is prepared.

As the material for plating member, nickel or nickel alloy may be used. To improve the durability of the plating member, carbon film such as diamond-like carbon may be formed by the method such as sputtering.

Using the plating member and the method such as injection molding, a resin substrate with pattern is prepared. As the resin material, acrylic resin such as polycarbonate, polymethyl methacrylate, etc., vinyl chloride resin such as polyvinyl chloride-vinyl chloride copolymer, epoxy resin, amorphous polyolefin, or polyester may be used. It is preferable to use polycarbonate because of moisture resistance, dimensional stability, and cost. In case burrs are found on the plating member thus formed, burrs are removed by burnishing or polishing. Groove depth of the pattern is preferably within the range of 50–1000 nm, or more preferably in the range of 200–500 nm.

As the magnetic material, Co, Co alloy (such as CoNi, CnNiZr, CoNbTaZr, etc.), Fe, Fe alloy (such as FeCo, FeCo, Ni, FeNiMo, FeAlSi, FeAl, FeTaN), Ni, Ni alloy (NiFe), etc. may be used. More preferably, FeCo or FeCoNi may be used. Prior to the formation of the magnetic layer of the master carrier for magnetic transfer to be used in the magnetic transfer method of the present invention, it is preferable to provide a nonmagnetic primer layer. It is preferable that crystal structure and lattice constant of the primer layer are on equal level with those of the magnetic layer.

As the material to form the primer layer, the material such as Cr, CrTi, CoCr, CrTa, CrMo, NiAl, Ru, etc. may be used.

The anisotropy field (Hk) of the magnetic layer can be adjusted by adequately selecting the magnetic layer material, pressure during sputtering, temperature during manufacture, and input power during sputtering, etc. Also, it is adjustable by changing the sputtering method such as DC sputtering, AC sputtering, etc.

A protective film such as diamond-like carbon (DLC) may be provided on the magnetic layer or a lubricant layer may be provided.

In particular, it is preferable that the diamond-like carbon of 5–30 nm and lubricant are present as protective film.

If the lubricant is present, it is possible to increase the durability even when friction occurs due to the compensation of the deviation caused in the contact process between the master carrier and the slave medium.

Description will be given below on the slave medium to be used in the present invention.

As the slave medium, a coating type magnetic recording medium with ferromagnetic metal particles dispersed in a binder, or a metal thin film type magnetic recording medium with ferromagnetic metal thin film formed on a substrate may be used.

As the coating type magnetic recording medium, Zip 100 or Zip 250, i.e. a recording medium for Zip (Iomega Inc.), or high density floppy disk called HiFD may be used.

It is preferable that coercive force (Hc) of the slave medium is within the range of 103 kA/m (1300 Oe)-313 kA/m (4000 Oe), or more preferably within the range of 127 kA/m (1600 Oe) to 239 kA/m (3000 Oe). If coercive force (Hc) of the slave medium is less than 103 kA/m, it is not possible to retain high density recording information of higher than 1 Gb per 6.45 cm$^2$ (1 Gb/square inch). On the contrary, if it is 313 kA/m or more, there is no magnetic recording head suitable for recording on the slave medium.

As the metal thin film type magnetic recording medium, the material such as Co, Co alloy (such as CoPtCr, CoCr, CoPtCrTa, CoPtCrNbTa, CoCrB, CoNi, etc.), Fe, Fe alloy (such as FeCo, FePt, FeCoNi) may be used. To provide clear and sharp transfer, it is preferable that there is magnetic anisotropy in the same direction as the magnetic layer of the master carrier for magnetic transfer, i.e. in in-plane direction in case of in-plane recording and in vertical direction in case it is vertical.

It is preferable that a nonmagnetic primer layer is provided under the magnetic layer, i.e. closer to the substrate, in order to provide the magnetic anisotropy required. It is preferable that crystal structure and lattice constant are equalized with those of the magnetic layer.

More concretely, as the material for forming the primer layer, the material such as Cr, CrTi, CoCr, CrTa, CrMo, Ni, Ru, etc. may be used.

It is preferable that the relation between the anisotropy field (Hk) of the master carrier for magnetic transfer of the present invention and the coercive force (Hc) of the slave medium is within the range of $4\times10^{-4}<(Hk/Hc)<2\times10^{-1}$, or more preferably within the range of $4\times10^{-3}<(Hk/Hc)<1.5\times10^{-1}$.

[Embodiment]

In the following, description will be given on embodiments of the present invention.

EXAMPLE 1

For a 3.5 type master carrier for magnetic transfer, a magnetic layer of 150 nm in thickness comprising FeCo (Co: 30 atom %) was prepared on a substrate of silicon wafer disk. The pattern was formed with radial lines with equal spacing of 8 µm in width from disk center to positions of 20–40 mm in radial direction. The line spacing was set to 8 µm at innermost position of 20 mm in radial direction.

For the preparation of the magnetic layer, DC sputtering method was used on a sputtering system (ANELVA; 730H). The manufacturing temperature was set to 25° C., argon sputtering pressure to $3.3\times10^{-4}$ Pa (0.25 mTorr), and input power to 2.54 W/cm$^2$.

As the slave medium, a coating type magnetic recording medium (manufactured by Fuji Photo Film Co., Ltd.) for Zip 250 (Iomega Inc) commercially available was used. Coercive force (Hc) of the slave medium was 199 kA/m (2500 Oe).

After initial DC magnetization of the slave medium at 398 kA/m (5000 Oe), the master carrier for magnetic transfer was closely fitted to the slave medium. Magnetic field of 199 kA/m (2500 Oe) was applied in a direction opposite to the direction of initial DC magnetization, and a recording information was transferred to the slave medium. The slave medium thus prepared was evaluated by the following evaluation methods to assess the magnetic transfer information.

EXAMPLE 2

A master carrier of Example 2 was prepared by the same procedure as in Example 1 except that the manufacturing temperature of the master carrier for magnetic transfer was changed to 60° C. Magnetic transfer was performed by the same procedure as in Example 1, and the evaluation was carried out.

EXAMPLE 3

A master carrier for magnetic transfer of Example 3 was prepared by the same procedure as in Example 1 except that the magnetic layer of the master carrier for magnetic transfer was changed to CoFeNi (atom ratio 65:22:13). Then, magnetic transfer was performed by the same procedure as in Example 1, and evaluation was performed.

EXAMPLE 4

A master carrier for magnetic transfer of Example 4 was prepared by the same procedure as in Example 1 except that the magnetic layer of the master carrier for magnetic transfer was changed to NiFe (atom ratio 80:20). Then, magnetic transfer was performed by the same procedure as in Example 1, and evaluation was performed.

COMPARATIVE EXAMPLE 1

A master carrier for magnetic transfer of Comparative example 1 was prepared by the same procedure as in Example 4 except that the manufacturing temperature of the magnetic layer of the master carrier for magnetic transfer of Example 4 was changed to 100° C. Then, magnetic transfer was performed by the same procedure as in Example 1, and evaluation was performed.

COMPARATIVE EXAMPLE 2

A master carrier of Comparative example 2 was prepared by the same procedure as in Comparative example 1 except that the magnetic layer of the master carrier for magnetic transfer of Comparative example 1 was changed to NiFeCuMo (atom ratio 76:14:6:4).

COMPARATIVE EXAMPLE 3

A master carrier for magnetic transfer of Comparative example 3 was prepared by the same procedure as in Example 1 except that the pressure during sputtering was changed to $3\times10^{-2}$ Pa (10 mTorr) on the magnetic layer of the master carrier for magnetic transfer of Example 1. Then, magnetic transfer was performed by the same procedure as in Example 1, and evaluation was made.

COMPARATIVE EXAMPLE 4

A master carrier for magnetic transfer of Comparative example 4 was prepared by the same procedure as in Example 1 except that a primer layer of IrMn (atom ratio 50:50) was provided on the magnetic layer of the master carrier for magnetic transfer of Example 1. The manufacturing temperature of IrMn primer layer was set to 200° C., sputtering pressure was set to 3.3×10⁻² Pa (25 mTorr), and film thickness to 30 nm.
(Evaluation Methods)
1. Method for Measuring Anisotropy Field.

AC demagnetization was performed on the master carrier for magnetic transfer using an AC demagnetizer (degausser). Then, magnetic field was increased from zero magnetic field using a vibration type magnetometer (VSM) for soft magnetic material, and magnetization value was determined. The magnetic field where magnetization value did not increase any more, i.e. magnetization was saturated, was defined as anisotropy field.

2. Quality of Transfer Signal

Using an electromagnetic transfer characteristics measuring system (Kyodo Electronics Co., Ltd.; SS-60), transfer signal on the slave medium was evaluated. An inductive head with head gap of 0.23 $\mu$m and track width of 3.0 $\mu$m was used as the head, and reproduction signal was examined. Measurement was performed on inner periphery of the disk (disk radius: 20 mm) of the slave medium after magnetic transfer. Magnetic signal intensity (TAA output) for one turn of the disk was measured, and it was expressed as DTAA.

The ratio of the magnetic signal intensity (HTAA) and DTAA in the recording reproduction by the above head is defined in the equation (1):

$$\text{Signal intensity ratio} = (\text{DTAA}/\text{HTAA}) \times 100 \quad (1)$$

In case the value of the equation (1) was 95% or more, it was evaluated as "good". If the value was lower than this, it was evaluated as "no good". To confirm the quality of the signal after magnetic transfer, reproduction signal was examined. The reproduction signal obtained was inputted to a digital oscilloscope (LeCroy Inc.; LC334AM), and evaluation was made on half-width (PW50) of the signal. If PW 50 was less than 300 nm, it was defined as "good". If it exceeded this value, it was defined as "no good".

TABLE 1

|  | Anisotropy field (Hk) (kA/m) | Hk/Hc | Signal intensity ratio × 100 | Half-width (nm) |
|---|---|---|---|---|
| Example 1 | 15.9 | 8.0 × 10⁻² | 96 (Good) | 282 (Good) |
| Example 2 | 2.4 | 1.2 × 10⁻² | 96 (Good) | 280 (Good) |
| Example 3 | 6.4 | 3.2 × 10⁻² | 97 (Good) | 279 (Good) |
| Example 4 | 0.4 | 2.0 × 10⁻³ | 97 (Good) | 277 (Good) |
| Comparative example 1 | 0.07 | 3.6 × 10⁻⁴ | 96 (Good) | 301 (No good) |
| Comparative example 2 | 0.04 | 2.0 × 10⁻⁴ | 93 (No good) | 305 (No good) |
| Comparative example 3 | 40.0 | 2.0 × 10⁻¹ | 90 (No good) | 280 (Good) |
| Comparative example 4 | 44.6 | 2.2 × 10⁻¹ | 91 (No good) | 283 (Good) |

As described above, according to the magnetic transfer method using the master carrier for magnetic transfer of the present invention, it is possible to perform magnetic transfer on a disk-type medium such as hard disk, large capacity removable disk medium, large capacity flexible medium, etc. within short time and with high productivity. Also, it is possible to perform the preformat recording of servo signal for tracking, address information signal, reproduction signal, etc. in stable manner and without resulting in deterioration of the quality of the transfer signal.

What we claimed is:

1. A magnetic transfer method for performing magnetic transfer to a magnetic recording medium, whereby relation between anisotropy field (Hk) of a master carrier for magnetic transfer and coercive force (Hc) of a slave medium satisfies the following condition:

$$4 \times 10^{-4} < (Hk/Hc) < 2 \times 10^{-1}$$

wherein the master carrier for magnetic transfer having a magnetic layer with a magnetic recording information recorded thereon is closely fitted to the slave medium where the information is to be transferred, and a magnetic recording information of the master carrier for magnetic transfer is transferred to the slave medium, whereby magnetization of the slave medium is performed by initial DC magnetization in track direction, and then, the master carrier for magnetic transfer is closely fitted to the slave medium processed by initial DC magnetization, a magnetic field for transfer is applied in a direction opposite to the direction of the initial DC magnetization on the surface of the slave medium, and magnetic transfer is performed.

2. A magnetic transfer method according to claim 1, wherein a magnetic recording medium having a slave medium with coercive force (Hc) within the range of 103 to 313 kA/m is used.

3. A magnetic recording medium, characterized in that servo signal is recorded on a magnetic recording medium by a method described in claim 1 or 2.

* * * * *